(12) United States Patent
Jung et al.

(10) Patent No.: US 11,170,939 B2
(45) Date of Patent: Nov. 9, 2021

(54) TANTALUM CAPACITOR INCLUDING BODY AND LEAD FRAME HAVING BENT PORTION FORMING INCLINATION ANGLE TOWARD THE BODY

(71) Applicant: SAMSUNG ELECTRO-MECHANICS CO., LTD., Suwon-si (KR)

(72) Inventors: Hun Chol Jung, Suwon-si (KR); Hong Kyu Shin, Suwon-si (KR); Wan Suk Yang, Suwon-si (KR); Ji Han Seo, Suwon-si (KR); Young June Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/778,978

(22) Filed: Jan. 31, 2020

(65) Prior Publication Data

US 2021/0043391 A1 Feb. 11, 2021

(30) Foreign Application Priority Data

Aug. 5, 2019 (KR) .......................... 10-2019-0095048

(51) Int. Cl.
*H01G 9/008* (2006.01)
*H01G 9/042* (2006.01)
*H01G 9/08* (2006.01)

(52) U.S. Cl.
CPC ............. *H01G 9/008* (2013.01); *H01G 9/042* (2013.01); *H01G 9/08* (2013.01)

(58) Field of Classification Search
CPC ......... H01G 9/012; H01G 9/008; H01G 9/042
See application file for complete search history.

(56) References Cited

U.S. PATENT DOCUMENTS

| 6,236,561 B1 * | 5/2001 | Ogino | ................... | H01G 9/012 |
| | | | | 361/301.3 |
| 6,870,727 B2 * | 3/2005 | Edson | ................... | H01G 2/065 |
| | | | | 361/523 |

(Continued)

FOREIGN PATENT DOCUMENTS

| JP | 07240351 A | * | 9/1995 | ............. H01G 9/012 |
| JP | 2002-158142 A | | 5/2002 | |

(Continued)

*Primary Examiner* — David M Sinclair
(74) *Attorney, Agent, or Firm* — Morgan, Lewis & Bockius LLP (57) ABSTRACT

A tantalum capacitor includes a tantalum body including tantalum powder, and having a tantalum wire exposed to one end surface; a molding portion including fifth and sixth surfaces opposed in a first direction, third and fourth surfaces opposed in a second direction, and first and second surfaces opposed in a third direction, and formed to surround the tantalum body; an anode lead frame exposed to the second surface of the molding portion, and connected to the tantalum wire; and a cathode lead frame spaced apart from the anode lead frame, and exposed to the second surface of the molding portion. The anode lead frame includes a first connection portion and a first bent portion, and the first bent portion forms an inclination angle within a range of less than 70° toward the tantalum body, based on the first connection portion.

16 Claims, 9 Drawing Sheets

(56) References Cited

U.S. PATENT DOCUMENTS

| | | | |
|---|---|---|---|
| 2002/0061613 A1 | 5/2002 | Sano et al. | |
| 2007/0188982 A1* | 8/2007 | Kuriyama | H01G 2/065 361/528 |
| 2009/0231784 A1* | 9/2009 | Matsuoka | H01G 9/26 361/528 |
| 2010/0061037 A1* | 3/2010 | Zednicek | H01G 9/012 361/523 |
| 2012/0075775 A1 | 3/2012 | Vyroubal | |
| 2015/0077904 A1 | 3/2015 | Kwak et al. | |
| 2016/0133390 A1* | 5/2016 | Yang | H01G 9/15 361/529 |

FOREIGN PATENT DOCUMENTS

| | | | | |
|---|---|---|---|---|
| JP | 2002299165 A | * | 10/2002 | H01G 9/012 |
| JP | 2003-109849 A | | 4/2003 | |
| JP | 2006253367 A | * | 9/2006 | H01G 9/15 |
| KR | 10-2012-0031870 A | | 4/2012 | |
| KR | 10-2015-0031680 A | | 3/2015 | |

* cited by examiner

TANTALUM CAPACITOR INCLUDING BODY AND LEAD FRAME HAVING BENT PORTION FORMING INCLINATION ANGLE TOWARD THE BODY

CROSS-REFERENCE TO RELATED APPLICATION

This application claims the benefit of Korean Patent Application No. 10-2019-0095048 filed on Aug. 5, 2019, with the Korean Intellectual Property Office, the disclosure of which is incorporated herein by reference.

TECHNICAL FIELD

The present invention relates to a tantalum capacitor, and more particularly, to a tantalum capacitor having improved capacitance.

BACKGROUND

Tantalum (Ta) is a metal that is widely used throughout various industrial sectors, such as in the aerospace industry and the defence sector, as well as in electrical, electronic, mechanical, and chemical fields, due to mechanical or physical properties such as a high melting point, excellent flexibility, excellent corrosion-resistance, and the like. Since tantalum (Ta) can form a stable anodic oxide film, tantalum has been widely used as a material in forming anodes for small capacitors. Recently, in accordance with the rapid development of information technology (IT) industries, such as electronics information and communications technology (ICT) and electronics technology, tantalum has been increasingly used on a year-on-year basis.

The conventional tantalum capacitor uses a structure for extracting the terminal to the outside without an internal lead frame or a frame in order to connect the tantalum material and the electrode.

In this case, in the case of a structure using the internal lead frame, a space occupied by the tantalum material in the molding portion is reduced by the lead frame constituting an anode and a cathode, and capacitance is proportional to a volume of the tantalum material. In this case, there may be a problem of limiting capacitance, and in the case of a structure in which a terminal is led out to the outside without a frame, there may be a problem in that ESR of the capacitor is increased because a contact resistance is increased by a plurality of contact materials due to presence of a large number of contact materials.

In addition, in the case of a structure in which a terminal is led out to the outside without a conventional frame, a cathode lead frame is located on the side surface of the product, and thus there is a problem in that capacitance may deteriorate, since an internal volume fraction of the tantalum material is reduced due to the need to secure a welding distance between the tantalum material and the cathode lead frame.

SUMMARY

An aspect of the present disclosure is to provide a tantalum capacitor capable of implementing high capacity.

Another aspect of the present disclosure is to provide a tantalum capacitor having excellent reliability by improving mechanical strength.

Another aspect of the present disclosure is to provide a tantalum capacitor having an improved breakdown voltage (BDV) by increasing a withstand voltage.

Another aspect of the present disclosure is to provide a tantalum capacitor capable of reducing ESR.

According to an embodiment of the present disclosure, a tantalum capacitor includes a tantalum body including tantalum powder, and having a tantalum wire exposed to one end surface a molding portion including fifth and sixth surfaces opposed in a first direction, third and fourth surfaces opposed in a second direction, and first and second surfaces opposed in a third direction, and formed to surround the tantalum body; an anode lead frame exposed to the second surface of the molding portion and connected to the tantalum wire; and a cathode lead frame spaced apart from the anode lead frame, and exposed to the second surface of the molding portion. The anode lead frame may include a first connection portion and a first bent portion, and the first bent portion may form an inclination angle within a range of less than 70° toward the tantalum body, based on the first connection portion.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral are same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the drawings, an X direction may be defined as a second direction and an L direction or a thickness direction, and a Z direction may be defined as a first direction, a stacking direction and a T direction or a thickness direction.

Figure 1A:
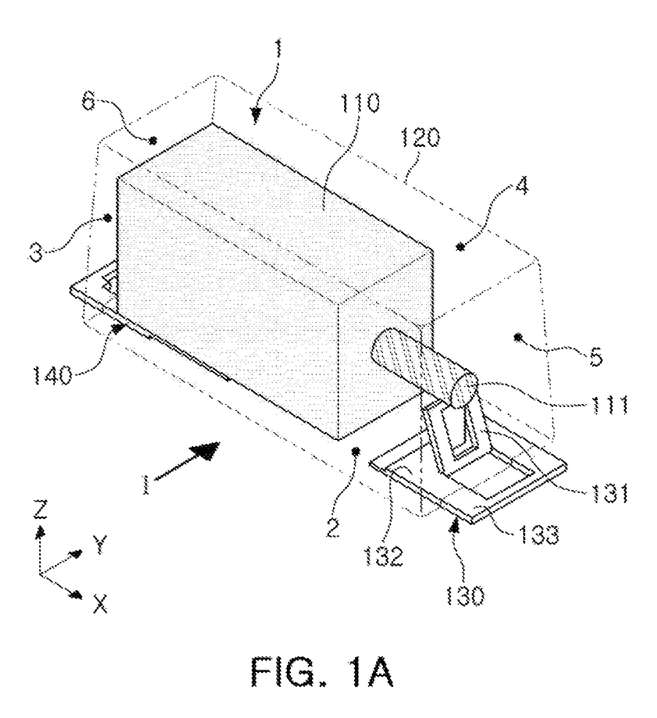
FIGS. 1A and 1B are perspective views illustrating a tantalum capacitor according to an embodiment of the present disclosure.
Figure 1B:
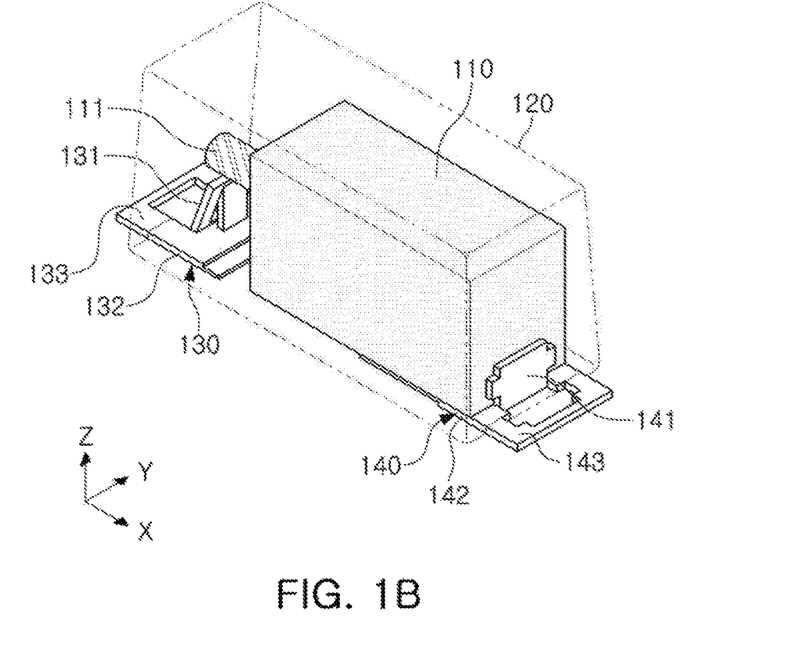
Figure 2:
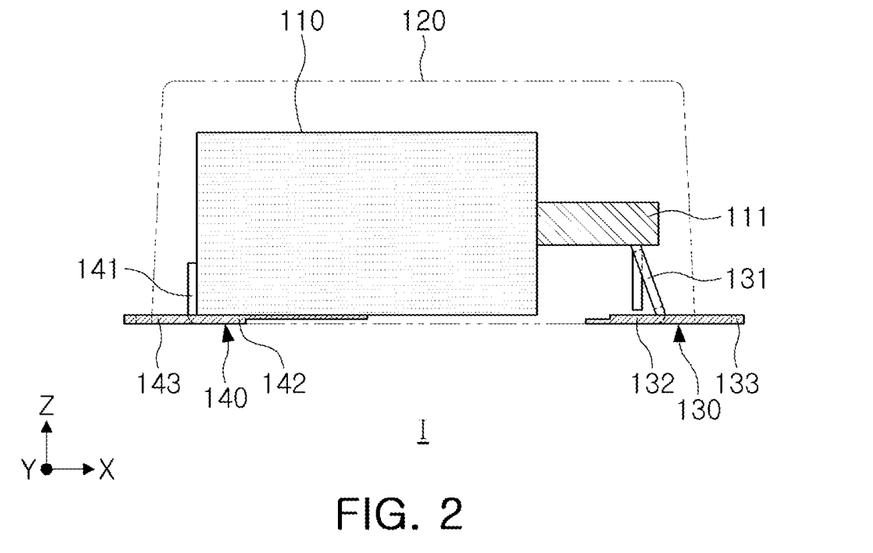
FIG. 2 is a side surface view of FIG. 1A viewed in an I direction.

FIGS. 1A and 1B are schematic perspective views of a tantalum capacitor according to an embodiment of the present disclosure, and FIG. 2 is a schematic side surface view of FIG. 1.

Referring to FIGS. 1A, 1B, and 2, a tantalum capacitor 100 of the present embodiment may include a tantalum body 110 including tantalum powder, and having a tantalum wire 111 exposed to one end surface; a molding portion 120 including fifth and sixth surfaces 5 and 6 opposed in a first direction, third and fourth surfaces 3 and 4 opposed in a second direction, and first and second surfaces 1 and 2 opposed in a third direction, and formed to surround the tantalum body 110; an anode lead frame 130 exposed to the second surface 2 of the molding portion 120 and connected to the tantalum wire 111; and a cathode lead frame 140 spaced apart from the anode lead frame 130 and exposed to the second surface 2 of the molding portion 120.

Figure 13A:
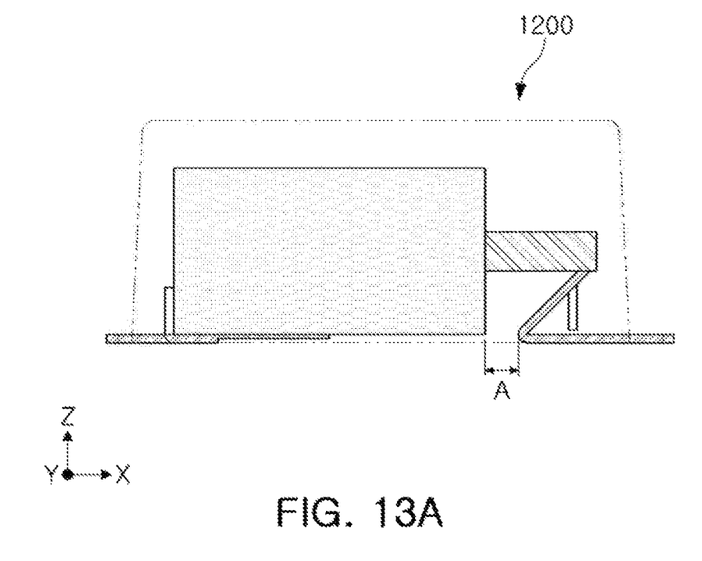
FIGS. 13A and 13B are a schematic diagram illustrating a difference between the Example and the Comparative Example of the present disclosure.
Figure 13B:
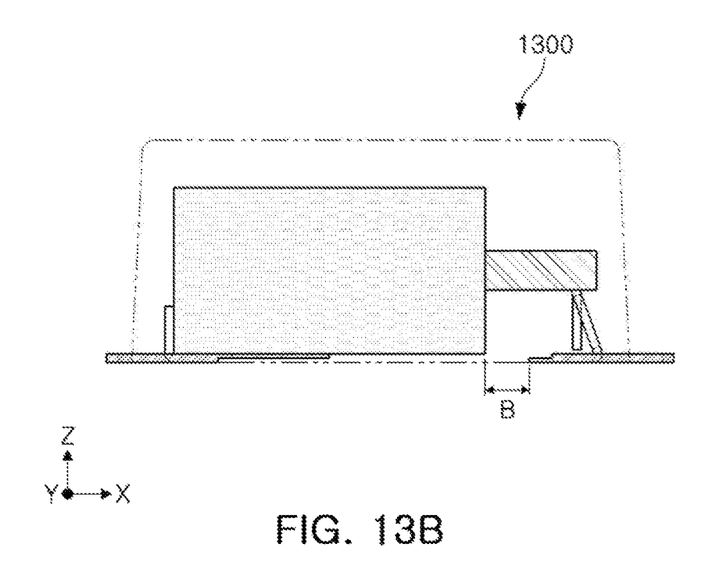

In this case, the anode lead frame 130 includes a first connection portion 132 and a first bent portion 131. The first bent portion 131 may form an inclination angle within a range of less than 70° toward the tantalum body 110, based on the first connection portion 132. FIGS. 13A and 13B are schematic diagrams, schematically illustrating a conventional tantalum capacitor 1200 and a tantalum capacitor 1300 according to the present disclosure respectively. Referring to FIGS. 13A and 13B, in the tantalum capacitor of the present disclosure, a distance B between the anode lead frame and the tantalum body may be disposed to be greater than a distance A of the conventional structure. That is, by increasing a volume of the tantalum body disposed inside the molding portion, the capacity of the tantalum capacitor of the present disclosure may be improved. In addition, the first bent portion forms an inclination angle within a range of less than 70° toward the tantalum body 110, based on the first connection portion 132, thereby maximizing the capacity of the tantalum capacitor according to the present disclosure.

The tantalum body 110 is formed by using a tantalum material. For example, the tantalum body 110 may be prepared by mixing and stirring the tantalum (Ta) powder and a binder at a predetermined ratio, compressing the mixed powder to form a generally rectangular parallelepiped shape, and then sintering the body under high-temperature and high-vibrations.

In addition, the tantalum body 110 may have a tantalum wire 111 exposed in the X direction of the body. The tantalum wire 111 may be inserted into a mixture of the tantalum powder and the binder so as to be eccentric from its center, before compressing the powder with the tantalum powder and the binder. That is, the tantalum body 110 may be formed by inserting the tantalum wire 111 into the tantalum powder mixed with a binder to form a tantalum element of a desired size, and then sintering the tantalum element under a high-temperature and high-vacuum ($10^{-3}$ torr or less) atmosphere for about 30 minutes.

The anode lead frame 130 may be made of a conductive metal such as a nickel/iron alloy, or the like, and may include a first connection portion 132 and a first lead portion 133 that are integrally formed.

In an embodiment of the present disclosure, the first connection portion 132 of the anode lead frame 130 may be exposed to the second surface 2 of the molding portion 120. The first connection portion 132 may be exposed to a lower surface of the molding portion 120 to serve as a terminal when mounting a substrate. In this case, the first connection portion 132 may be disposed to be spaced apart from the tantalum body 110, and a resin component constituting the molding portion 120 to be described later may be filled in a separated space between the first connection portion 132 and the tantalum body 110.

In an embodiment of the present disclosure, an anode lead frame 130 may include a first lead portion 133 and a cutting surface. The first lead portion 133 may mean a portion of the anode lead frame 130 except for the first connection portion 132 and the first bent portion 131. In this case, the anode lead frame 130 may include a cutting surface, and a portion to be bent based on the cutting surface may mean a first bent portion, and a portion not to be bent may mean a first lead portion, respectively. The cutting surface may be formed in a first direction, a second direction and/or a third direction of the anode lead frame 130. In the present specification, drawings are illustrated based on a structure in which the anode lead frame has a cutting surface, and the first lead portion exists, but also based on a structure in which the anode lead frame does not have the cutting surface. In the case of the structure not having the cutting surface, it may mean a structure in which only the first bent portion exists, and the first lead portion does not exist.

Figure 3:
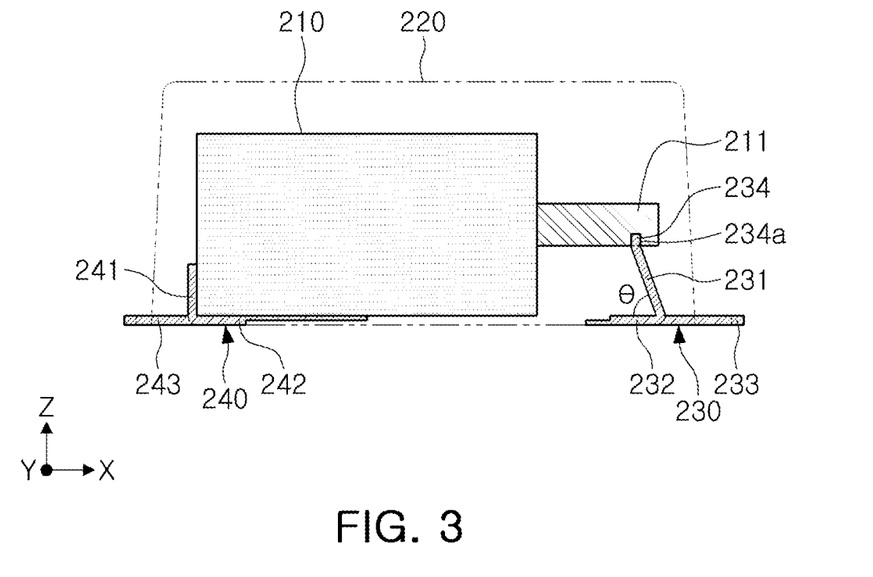
FIG. 3 is a side surface view of a tantalum capacitor according to another embodiment of the present disclosure.

In another embodiment of the present disclosure, the first bent portion 131 may form an inclination angle θ within a range of less than 70° toward the tantalum body, based on the first connection portion 132. The first bent portion 131 forms an inclination angle θ toward the tantalum body, which may mean a structure in which the end of the other side of the bent portion faces the tantalum body. Referring to FIG. 3, the inclination angle θ may mean an angle between the first bent portion 231 and the first connection portion 232. The inclination angle θ may be less than 70°, 69° or less, 68° or less, 67° or less, 66° or less, or 65° or less, but is not limited thereto. When the inclination angle θ between the first bent portion 231 and the first connection portion 232 satisfies the above range, mechanical stress may be alleviated to improve mechanical reliability. On the other hand, when it is outside of the above range, there may be a high possibility of occurrence of a short due to the change in the position of the tantalum body and the tantalum wire.

In an example, the inclination angle θ between the first bent portion 231 and the first connection portion 232 may be in a range exceeding 50°. The inclination angle θ may be 51° or more, 52° or more, 53° or more, 54° or more, or 55° or more, but is not limited thereto. When the inclination angle of the first bent portion and the first connection portion satisfies the above-described range, mechanical reliability may be improved while increasing the capacity of the product. On the other hand, when it is outside of the above range, the tantalum body may be exposed externally of the molding portion or the molding portion may be formed too thin, thereby increasing the possibility of exposure defects.

In an embodiment of the present disclosure, the anode lead frame may be provided with a groove in which the tantalum wire is fitted and coupled to the end portion of the first bent portion. FIG. 3 illustrates a tantalum capacitor according to the present embodiment. Referring to FIG. 3, a groove may be disposed in an end portion of the first bent portion 231 of the anode lead frame 230, and the tantalum wire 211 may be fitted and coupled to the groove of the end portion of the first bent portion 231. In this case, the tantalum wire 211 and the end portion of the first bent portion 231 are described as being in contact with an U-shape, but the present disclosure is not limited thereto, If necessary, a semi-circular shape, a V-shape, or a square shape.

In the tantalum capacitor according to the preset embodiment, a groove in which the tantalum wire 211 is fitted and coupled may be disposed to the end portion of the first bent portion 231 to increase the contact area between the first bent portion 231 and the tantalum wire 211, and thus it is possible to prevent a problem in which electrical connectivity is deteriorated by making a stable operation during welding. A method for forming the groove is not particularly limited, and for example, it may be formed by punching or cutting a portion of the first bent portion 231.

Figure 4:
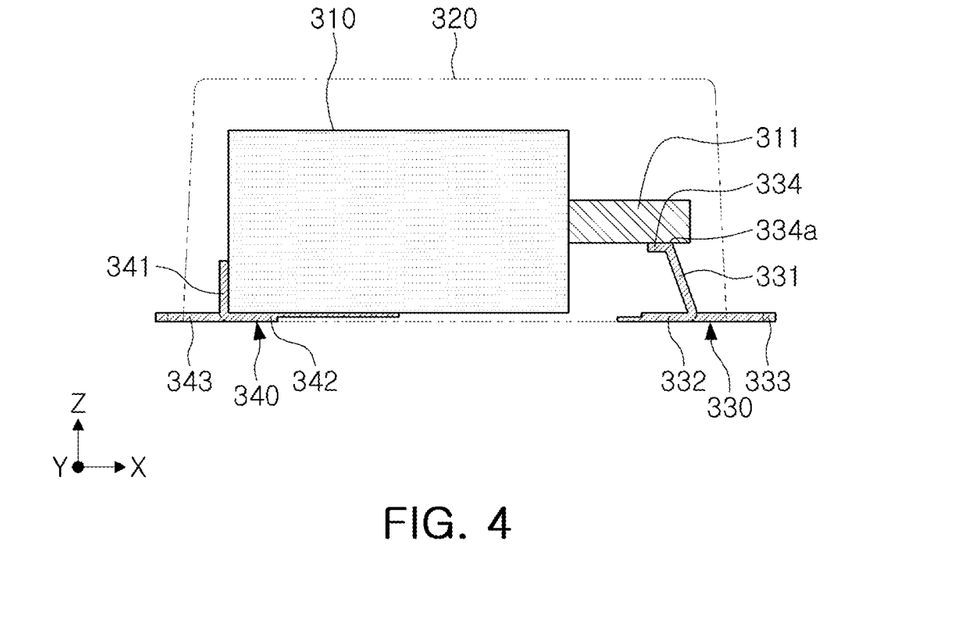
FIG. 4 is a side surface view of a tantalum capacitor according to another embodiment of the present disclosure.
Figure 5:
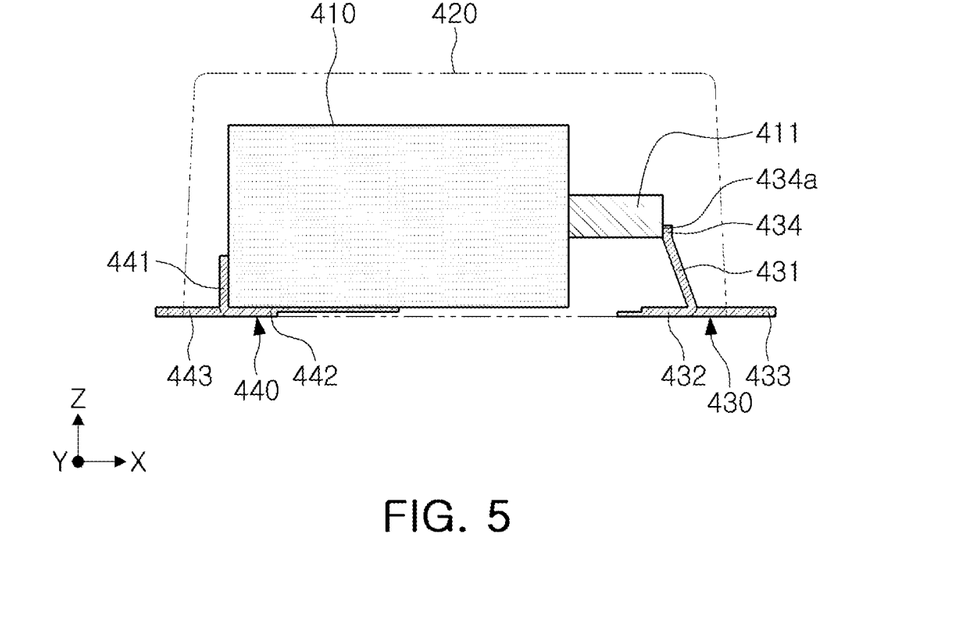
FIG. 5 is a side surface view of a tantalum capacitor according to another embodiment of the present disclosure.

In an embodiment of the present disclosure, the anode lead frame may include a bending portion at the end of the first bent portion, and the bending portion may be connected to the tantalum wire. FIGS. 3 to 5 are views illustrating a tantalum capacitor in which bending portions disposed at the end of the first bent portion. FIG. 4 is a view illustrating an example of the present embodiment. Referring to FIG. 4, a bending portion 334 may be disposed at an end of the first bent portion 331, and the tantalum wire 311 may be in contact with the bending portion 334. In this case, the bending portion 334 may be bent to a lower end of the tantalum wire 311, and an upper surface 334a of the bending portion 334 may be connected to the tantalum wire 411.

FIG. 5 is a view illustrating another example of the above embodiment. Referring to FIG. 5, a bending portion 434 may be disposed at an end of the first bent portion 431, and a tantalum wire 411 may be in contact with the bending portion 434. In this case, the bending portion 434 may be bent to a side surface of the tantalum wire 411, and a side surface 434a of the bending portion 434 may be in contact with the tantalum wire 411.

In the case of FIG. 3 as described above, which is another example of the above embodiment, a bending portion may be disposed at an end of the first bent portion. Referring to FIG. 3, a bending portion 234 may be disposed at the end of the first bent portion 231, and a groove may be disposed in the bending portion 234. In addition, a tantalum wire 211 may be in contact with the bending portion 234 through the groove of the bending portion 234. In this case, the bending portion 234 may be bent toward the tantalum wire 311, and the groove portion 234a of the bending portion 234 may be connected to the tantalum wire 211.

As described above, the bending portion may be disposed at the end of the first bent portion and the tantalum wire may be connected through the bending portion to reduce the length of the tantalum wire, thereby reducing the length. Thus, the length of the tantalum body may be further increased by the reduced length of the tantalum wire to further secure capacity.

In addition, in the above embodiment, the tantalum wire is bonded in an inclined contact state with the first bent portion through the bending portion, and thus welding is performed while applying a force in an inclined direction of the first bent portion, such that lifting of the tantalum body may be prevented, and a residual stress of the welding may be prevented, thereby preventing problems such as deterioration of LC characteristics of the tantalum capacitor.

In this case, the welding is preferably using an electric spot welding method, but the present disclosure is not necessarily limited thereto.

Figure 6:
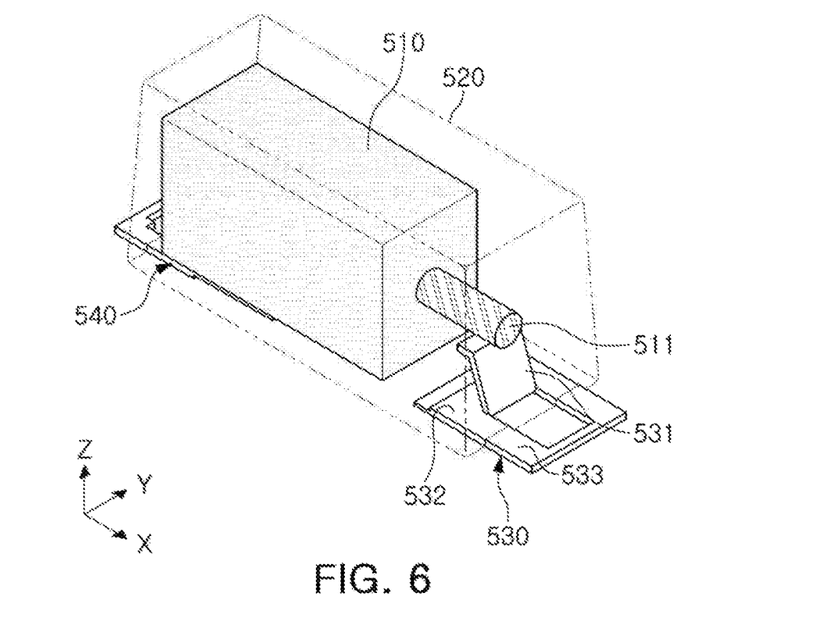
FIGS. 6 to 8 are schematic diagrams illustrating a first bending portion and a first lead portion according to an embodiment of the present disclosure.
Figure 7:
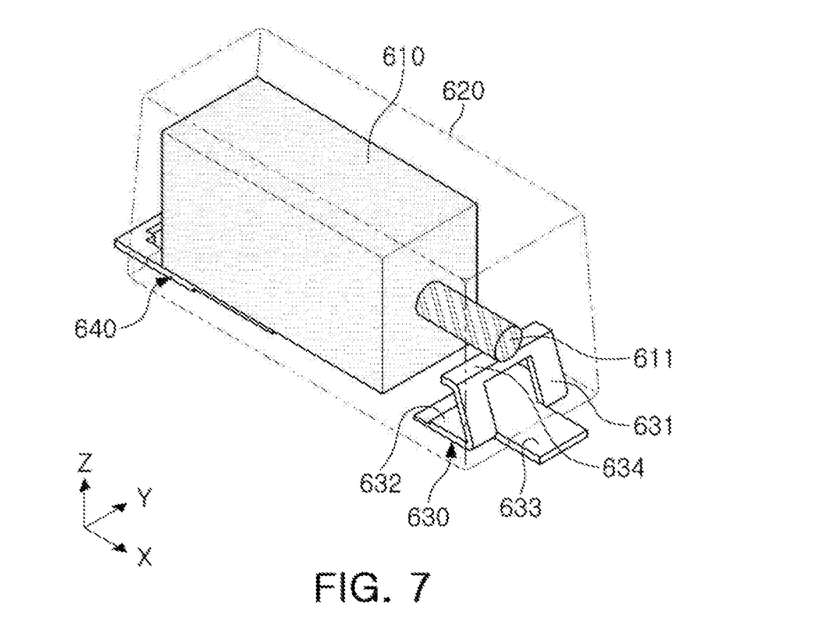
Figure 8:
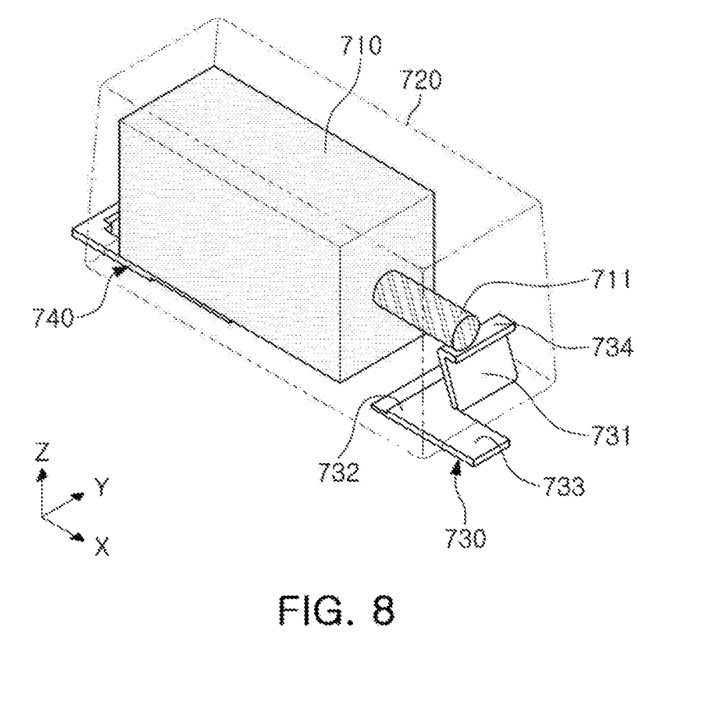

The first bent portion described above, respectively denoted by 531 in FIG. 6, 631 in FIG. 7, and 731 in FIG. 8, may be formed at a central portion of the anode lead frame 530 in FIG. 66, may be formed outside of the anode lead frame 630 in FIG. 7, or may be formed at one side of the anode lead frame 730 in FIG. 8, but is not limited thereto. It may be bent in the anode lead frame and may be deformed into various forms to connect to the tantalum wire in a structure that satisfies the aforementioned inclination angle.

In one example, the anode lead frame 130 may include a first lead portion 133, and the first lead portion 133 may be disposed to protrude outside of the molding portion 120. The first lead portion 133 may mean a region divided from the first connection portion 132 described above by a boundary of the bent portion of the first bent portion 131 in the first anode lead frame 130. Referring to FIG. 1A, the anode lead frame 130 may include a first bent portion 131, a first connection portion 132, and a first lead portion 133, and among them, the first lead portion 133 may protrude outside of the molding portion 120. As the present example, when the first lead portion 133 is disposed to protrude outside of the molding portion 120, a bonding area of the solder may be increased when mounting a substrate of the tantalum capacitor according to the present disclosure to improve a substrate fixing force.

Figure 9:
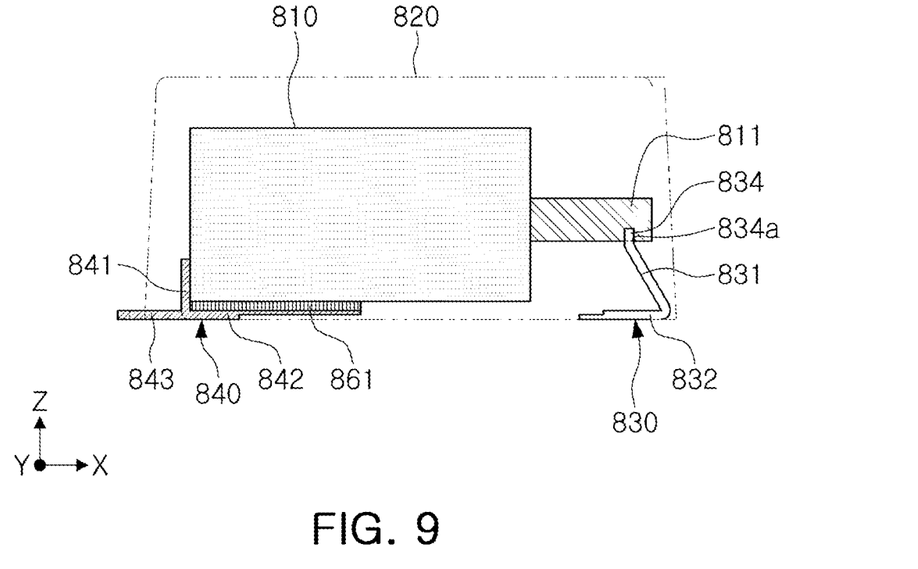
FIG. 9 is a side surface view of a tantalum capacitor according to another embodiment of the present disclosure.

In addition, as illustrated in FIG. 9, when the anode lead frame 830 does not a separate cutting surface, the anode lead frame 830 may include a first bent portion 831 and a first connection portion 832, and may not include a first lead portion. In this case, the anode lead frame 830 may be exposed to the outside of the molding portion 820 only through the first connection portion 832. The structure is a structure in which the connection portion is exposed only to the second surface 2 of the molding portion 830, and it is possible to prevent a short with other components and to increase the mounting density of the substrate.

A cathode lead frame 140 of the tantalum capacitor according to the present disclosure may be made of a conductive metal such as nickel/iron alloy, or the like, and may include a second bent portion 141 and a second lead portion 143, that are integrally formed.

The second lead portion 143 may be disposed to be spaced apart from each other in parallel with the first connection portion 132 of the anode lead frame 130 in the X direction. The second connection portion 142 of the cathode lead frame 140 may be exposed to the second surface 2 of the molding portion 120. The second connection portion 142 may be exposed to the lower surface of the molding portion 120 to serve as a terminal when mounting a substrate. In this case, the second connection portion 142 may be in contact with the tantalum body 110, and may function as a cathode of the tantalum capacitor according to the present disclosure.

In an embodiment of the present disclosure, the second bent portion 141 may be vertically bent to toward the tantalum body 110. Referring to FIG. 1B, the cathode lead frame 140 may include a second bent portion 141 and a second lead portion 143, and the second bent portion 141 may be bent toward the tantalum body 110. Thus, it is possible to maximize the mechanical strength of the tantalum capacitor of the present embodiment.

Figure 10:
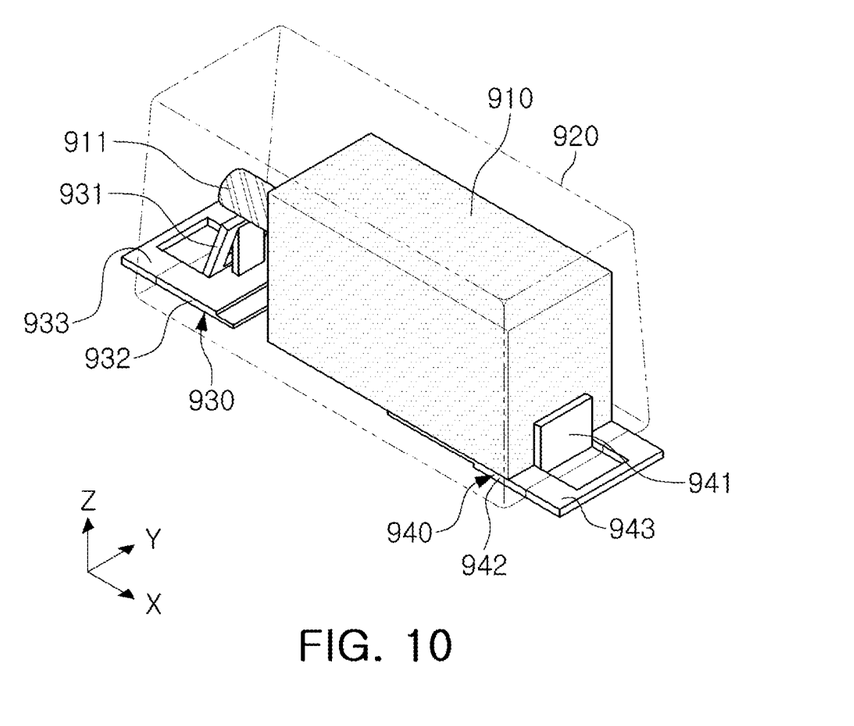
FIGS. 10 to 12 are schematic diagrams illustrating a second bending portion and a second lead portion according to an embodiment of the present disclosure.
Figure 11:
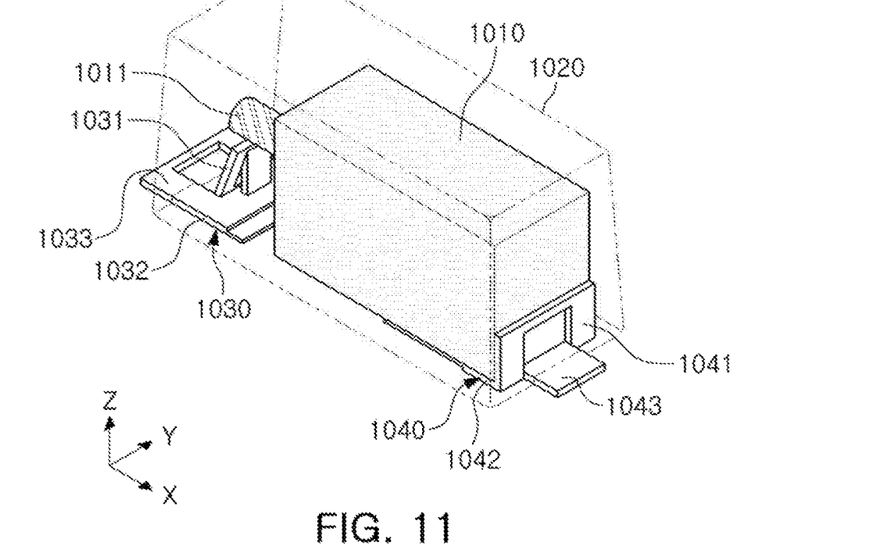
Figure 12:
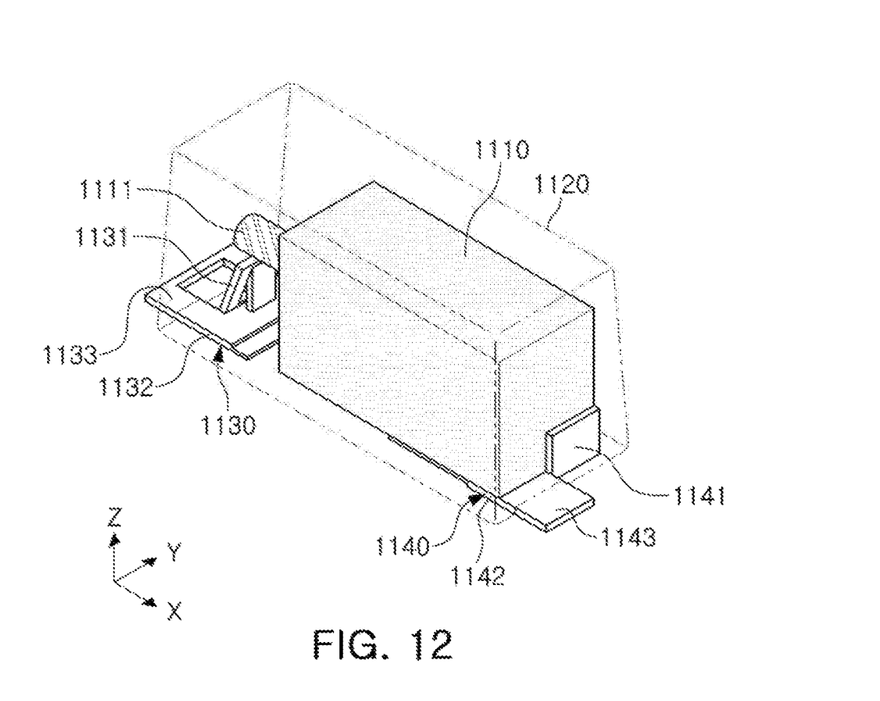

The second bent portion, respectively denoted by 941 in FIG. 10, 1041 in FIG. 11, and 1141 in FIG. 12, may be formed at a central portion of the cathode lead frame 940 in FIG. 10, may be formed outside of the cathode lead frame 1040 in FIG. 11, and may be formed on one side of the cathode lead frame 1140 in FIG. 12, but is not limited thereto. The second bent portion may be modified in various forms in which the second bent portion is connected to the tantalum body in the bent structure by the cathode lead frame.

In an embodiment of the present disclosure, the cathode lead frame 140 may include a second lead portion 143 and a cutting surface. The second lead portion 143 may mean a portion of the cathode lead frame 140 except for the second connection portion 142 and the second bent portion 141. In this case, the cathode lead frame 140 may include a cutting surface, and a portion to be bent based on the cutting surface may mean a second bent portion, and a portion not to be bent may mean a second lead portion, respectively. The cutting surface may be formed in a first direction, a second direction, and/or a third direction of the cathode lead frame 140. In the present specification, drawings are illustrated based on a structure in which the cathode lead frame has a cutting surface, and the second lead portion exists, but based on a structure in which the anode lead frame does not have the cutting surface. In the case of the structure not having the cutting surface, it may mean a structure in which only the second bent portion exists and the second lead portion does not exist.

In one example, the second lead portion 143 of the cathode lead frame 140 may be disposed to protrude outside of the molding portion 120. The second lead portion 143 may mean a region divided from the second connection portion 142 by a boundary of the bent portion of the second bent portion 141 as described above in the cathode lead frame 140. Referring to FIG. 1B, the cathode lead frame 140 may include a second bent portion 141, a second connection portion 142, and a second lead portion 143, and the second lead portion 143 among these portions may protrude outside of the molding portion 120. As the present example, when the second lead portion 143 is disposed to protrude outside of the molding portion 120, when the tantalum capacitor is mounted on the substrate, a bonding area of the solder may be increased to improve a substrate fixing force.

In addition, when the cathode lead frame does not have a separate cutting surface, the cathode lead frame may include a second bent portion and a second connection portion, and may not include a second lead portion. In this case, the cathode lead frame may be exposed to the outside of the molding portion only through the second connection portion. The structure is a structure in which the connection portion is exposed only to the second surface 2 of the molding portion. The structure has an advantage which can prevent a short with other components and can increase the mounting density of the substrate.

In an embodiment of the present disclosure, a conductive adhesive layer 861 may be disposed between the second bent portion of the cathode lead frame and the tantalum body. In addition, a conductive adhesive layer 861 may be disposed between the second connection portion of the cathode lead frame and the tantalum body. The conductive adhesive layer 861 may be formed by applying and curing a certain amount of a conductive adhesive, including an epoxy-based thermosetting resin and conductive metal powder such as silver (Ag), or the like, but the present disclosure is not limited thereto. When the conductive adhesive layer is applied to the tantalum capacitor of the present disclosure, it is possible to improve fixing strength of the cathode lead frame.

A molding portion 120 of the tantalum capacitor according to the present disclosure may be formed by transfer molding a resin such as an epoxy molding compound (EPC), or the like, to surround the tantalum body 110. The molding portion 120 serves to protect the tantalum wire 111 and the tantalum body 110 from an outside.

In addition, the molding portion may be formed such that one surface of the first connection portion 132 of the anode lead frame 130 and one surface of the second connection portion 142 of the cathode lead frame 140 are exposed.

In the tantalum capacitor according to the present disclosure, an anode terminal may be formed on the first connection portion, and a cathode terminal may be formed on the second connection portion, as described above. The anode terminal and/or the cathode terminal may include a conductive material, such as one of a chromium titanium intermetallic compound (Cr (Ti)), copper (Cu), nickel (Ni), palladium (Pd), gold (Au), or a combination thereof, may be formed by a sputter deposition method or a plating method.

Table 1 below shows an experimental example when an angle of the first bent portion is different with respect to a tantalum capacitor having a shortest distance of 0.4 mm between the anode lead frame and the tantalum body.

TABLE 1

| Bending angle(°) | Bending height(mm) | Short(High LC) | Exposure defect (sixth surface) | Exposure defect (first surface) | Exposure defect (second surface) |
|---|---|---|---|---|---|
| 40 | 0.303 | OK | NG | OK | NG |
| 45 | 0.331 | OK | NG | OK | NG |
| 50 | 0.352 | OK | NG | OK | NG |
| 55 | 0.37 | OK | OK | OK | OK |
| 60 | 0.387 | OK | OK | OK | OK |
| 65 | 0.403 | OK | OK | OK | OK |
| 70 | 0.413 | NG | OK | OK | OK |
| 75 | 0.42 | NG | OK | NG | OK |
| 80 | 0.424 | NG | OK | NG | OK |

* NG refers to Not Good

Referring to Table 1, when the angle of the first bent portion is lowered to 50° or less, the position of the tantalum body during welding of the tantalum wire and the first bent portion is close to the second surface and/or the third surface of the molding portion, and thus a defect in which the tantalum body is exposed to the outside of the molding portion may occur.

On the other hand, when the angle of the first bent portion is increased to 70° or more, a short occurs as an interval between the tantalum body and the anode lead frame is greatly reduced during welding of the tantalum wire and the first bent portion, and a defect in which the tantalum body is exposed to the first surface of the molding portion will occur.

Accordingly, it can be seen from Table 1 that an inclination angle θ of the first bent portion may be adjusted within a predetermined range to provide a tantalum capacitor having a maximized capacity even in the same standard. Therefore, even in the same size, it is possible to maximize the characteristic of the tantalum capacitor, with which the withstand voltage is increased as the volume of the body increases, and to improve reliability of the product by improving the BDV of the component.

In addition, it can be seen through Table 1 that the bending height of the first bent portion may be adjusted to a certain height by adjusting the inclination angle θ of the first bending portion to a predetermined range. The first bent portion having the bending height may effectively alleviate mechanical impacts generated during welding due to the bent structure.

The following is a summary list of reference numerals and the exemplary structure used in the above description of the invention: tantalum body—110, 210, 310, 410, 510, 610, 710, 810, 910, 1010, 1110; tantalum wire—111, 211, 311, 411, 511, 611, 711, 811, 911, 1011, 1111; molding portion—120, 220, 320, 420, 520, 620, 720, 820, 920, 1020, 1120; anode lead frame—130, 230, 330, 430, 530, 630, 730, 830, 930, 1030, 1130; first bent portion—131, 231, 331, 431, 531, 631, 731, 831, 931, 1031, 1131; first connection portion—132, 232, 332, 432, 532, 632, 732, 832, 932, 1032, 1132; first lead portion—133, 233, 333, 433, 533, 633, 733, 933, 1033, 1133; bending portion—234, 334, 434, 634, 734, 834; groove portion—234a, 334a, 434a, 834a; cathode lead frame—140, 240, 340, 440, 540, 640, 740, 840, 940, 1040, 1140; second bent portion—141, 241, 341, 441, 841, 941, 1041, 1141; second connection portion—142, 242, 342, 442, 842, 942, 1042, 1142; second lead portion—143, 243, 343, 443, 843, 943, 1043, 1143; conductive adhesive layer—861; conventional tantalum capacitor —1200; a tantalum capacitor—1300.

As set forth above, according to exemplary embodiments according to an embodiment of the present disclosure, a high-capacity tantalum capacitor may be provided by increasing an effective volume of the tantalum body.

According to another embodiment of the present disclosure, a tantalum capacitor having excellent mechanical reliability may be provided by increasing adhesion of positive and negative lead frames.

According to another embodiment of the present disclosure, a withstand voltage and a breakdown voltage of the tantalum capacitor may be increased by increasing the volume of the tantalum body.

According to another embodiment of the present disclosure, a length of an electrical signal may be reduced to reduce ESR of the tantalum capacitor.

However, various and advantageous advantages and effects of the present invention are not limited to the above description, and will be more readily understood in the course of describing specific embodiments of the present disclosure.

While exemplary embodiments have been shown and described above, it will be apparent to those skilled in the art that modifications and variations could be made without departing from the spirit and scope of the present disclosure as defined by the appended claims.

What is claimed is:

1. A tantalum capacitor comprising:
a tantalum body including tantalum powder, and having a tantalum wire exposed to one end surface;
a molding portion including fifth and sixth surfaces opposed in a first direction, third and fourth surfaces opposed in a second direction, and first and second surfaces opposed in a third direction, and formed to surround the tantalum body;
an anode lead frame exposed to the second surface of the molding portion, and connected to the tantalum wire; and
a cathode lead frame spaced apart from the anode lead frame, and exposed to the second surface of the molding portion,
wherein the anode lead frame comprises a first connection portion and a first bent portion bent from the first connection portion, and the first bent portion forms an inclination angle within a range of less than 70° toward the tantalum body, based on the first connection portion.

2. The tantalum capacitor of claim 1, wherein the inclination angle is in the range of exceeding 50°.

3. The tantalum capacitor of claim 1, wherein the anode lead frame comprises a cutting surface and a first lead portion, and the first lead portion and the first bent portion are divided based on the cutting surface.

4. The tantalum capacitor of claim 1, wherein the anode lead frame is provided with a groove in which the tantalum wire is fitted and coupled to an end portion of the first bent portion.

5. The tantalum capacitor of claim 1, wherein the anode lead frame comprises a bending portion at an end of the first bent portion, and the bending portion and the tantalum wire is connected.

6. The tantalum capacitor of claim 1, wherein the first connection portion is disposed to be spaced apart from the tantalum body.

7. The tantalum capacitor of claim 1, wherein the anode lead frame comprises a first lead portion, and the first lead portion protrudes outside of the molding portion.

8. The tantalum capacitor of claim 1, wherein the cathode lead frame comprises a second connection portion and a second bent portion vertically bent toward to the tantalum body.

9. The tantalum capacitor of claim 8, wherein the cathode lead frame comprises a cutting surface and a second lead portion in a tantalum body direction, and
the second lead portion and the second bent portion are divided based on the cutting surface.

10. The tantalum capacitor of claim 9, wherein the second lead portion protrudes outside of the molding portion.

11. The tantalum capacitor of claim 8, wherein a conductive adhesive layer is disposed between the second bent portion and the tantalum body.

12. The tantalum capacitor of claim 8, wherein a conductive adhesive layer is disposed between the cathode lead frame and the tantalum body.

13. A tantalum capacitor, comprising:
a tantalum body including tantalum powder, and having a tantalum wire enclosed therein, the tantalum wire being exposed to an end surface of the tantalum body in a longitudinal direction relative to the tantalum body;
a molding portion having a mounting surface and enclosing the tantalum body and the tantalum wire;
a cathode lead frame exposed to the mounting surface;
an anode lead frame exposed to the mounting surface, spaced apart from the cathode lead frame in the longitudinal direction, and connected to the tantalum wire by a first bent portion bent from the anode lead frame towards the tantalum body at an angle of less than 70° relative to the mounting surface.

14. The tantalum capacitor of claim 13, wherein the angle is greater than 50°.

15. The tantalum capacitor of claim 13, wherein the anode lead frame comprises a first lead portion extending outside the molding portion in the longitudinal direction.

16. The tantalum capacitor of claim 13, wherein the cathode lead frame is connected to the tantalum body by a conductive adhesive.

* * * * *